United States Patent [19]

König

[11] Patent Number: 4,467,906

[45] Date of Patent: Aug. 28, 1984

[54] TRANSPORT HANGER FOR TRANSPORTING DOUGH PORTIONS

[76] Inventor: Helmut König, Ursprungweg 70-72, Graz, Austria, A-8045

[21] Appl. No.: 348,120

[22] Filed: Feb. 11, 1982

[30] Foreign Application Priority Data

Feb. 20, 1981 [AT] Austria .................................. 795/81

[51] Int. Cl.$^3$ .............................................. B65G 17/16
[52] U.S. Cl. .................................. 198/705; 198/365; 198/802
[58] Field of Search ............... 198/365, 484, 631, 750, 198/680, 796, 802, 705

[56] References Cited

U.S. PATENT DOCUMENTS

| | | | |
|---|---|---|---|
| 2,219,410 | 10/1940 | Bradshaw | 198/342 X |
| 3,006,452 | 10/1961 | Hill | 198/680 X |
| 3,550,748 | 12/1970 | Hauer | 198/365 |
| 3,581,891 | 6/1971 | Rysti | 198/680 X |
| 3,695,415 | 10/1972 | Bakker et al. | 198/631 |

*Primary Examiner*—Jeffrey V. Nase
*Attorney, Agent, or Firm*—Townsend and Townsend

[57] ABSTRACT

A hanger for transporting dough portions through a fermentation chamber or the like is adapted to be suspended on chains running through said chamber and has an arcuated support member covered by a textile band in the form of an endless loop carrying the dough pieces to be transported. The textile band is fixed to a rod extending parallel to the swivelling axis of the hanger and is connected to a drive means. When this drive means is actuated, the rod is moved along the surface of the support member and thus the textile band carrying the dough pieces is moved relative to the support member so that the dough pieces are transported towards the leading edge of the support member so that the dough portions, when the hanger is tilted, do not have to fall over a considerable distance. The initiation of movement of the drive means for the rod may be made by means of a fixed stop provided stationarily in the fermentation chamber and protruding into the path of travel of a double lever, one arm of which is connected to the rod. In another embodiment a moved lever is used for moving an extension of the rod when the hanger is tilted.

8 Claims, 6 Drawing Figures

TRANSPORT HANGER FOR TRANSPORTING DOUGH PORTIONS

BACKGROUND OF THE INVENTION

1. Field of the Invention

The invention refers to a transport hanger for dough portions, particularly for use in fermentation compartments or proofing chambers or the like, comprising a support means, particularly a vaulted plate, for the dough portions, the hanger being adapted to be suspended on a transport system, particularly on chains extending to both sides of the support means, for pivotal movement around a horizontal axis.

2. The Prior Art

It is known that dough portions must be subjected to a fermentation or rising process after weighing and kneading the dough portions and prior to introducing same into the baking oven. For automatically performing this process it is known to transport the dough portions through a fermentation compartment or proofing chamber on transport hangers being pivotally connected to endless chains for being swivelled around the horizontal axes. Such transport hangers and compartments or chambers through which they are transported, are well known for one skilled in the art and have been described in detail; for example in the U.S. patent specification No. 2,219,410 (Bradshaw) or in the Austrian patent specification No. 278,678 (Prohaska).

In most cases such hangers are provided with a troughlike support means for the dough portions, said support means being cladded with textile material, usually felt. The support means itself can be provided with holes for aerating the dough portions.

Removal of the dough portions from such hangers is effected either by means of guide drums along which the chains are moved, the hangers being guided such that the hangers are swivelled around their horizontal pivotal axes. Another way is to provide studs protruding into the travelling path of the hangers and thus swivelling the hangers such that the dough portions are thrown off the hangers. In both cases the dough portions, when they are thrown off the hangers and fall on a new support means, particularly a conveyor belt, are subjected to a certain stress, frequently on account of the dough portion slightly adhering to the textile cladding of the support means of the hangers and thus falling down from the hangers with some time lag, or on account of the dough portions having to fall down a considerable height and thus being deformed by the action of their own mass when arriving on the supporting surface receiving the dough portions. As a consequence, the pastry produced is frequently misshaped or has a reduced weight.

SUMMARY OF THE INVENTION

It is an object of the invention to improve a transport hanger for dough portions of the initially defined type such that the dough portions are delivered from the hangers in a more sparing manner, thus reliably preventing the dough portion from being subjected to severe stress.

It is a further object of the invention to avoid the drawback of the known hangers that the dough pieces, when they come free from the hanger, have to fall a considerable distance.

It is another object of the invention to provide for a smooth transfer of the dough portions when the hanger is tilted in order to transfer the dough pieces to a conveyor belt or the like.

It is another object of the invention to facilitate loosening of the dough portions from the hanger when the dough portions have to be transfered from the hanger to a conveyor belt or the like, so that the dough portions do not inadvertently adhere to the hanger.

These objects are, according to the invention, essentially achieved in that in a transport hanger for transporting dough portions, adapted to be suspended for pivotal movement around a horizontal axis on a transport system, a frame is provided having a substantially horizontal extending support means for supporting the dough portions, said support means having an edge, a band means of flexible material surrounding said support means and covering same in the form of a closed loop and being in contact with said support means, a rod extending substantially parallel to said support means and being connected to said band means is provided, and wherein a drive means is provided acting on said rod for moving the rod along the surface of said support means for moving the dough portions resting on said band means towards said edge. By means of such a transport hanger the dough portions resting on the band means, immediatly before the hanger is tilted, are transported by the band means in the direction of the edge of the support means, at latest at the beginning of the swivelling movement of the hanger so that the swivelling step of the hanger becomes effective on a dough portion located at the edge of the support means. Thus the dough portion has to fall down from a smaller height and is thus placed on the receiving surface (conveyor belt or the like) in a more sparing manner.

According to a preferred embodiment of the invention the band means is a textile band, for example felt or the like. Textile bands of suitable material have been shown to be most convenient, not only for the transporting process through the fermentation compartment or proofing chamber itself, but also in view of a reliable throwing of the dough portion from the support means.

The type and the construction of the drive means effecting the movement of the band means and of the dough portions resting thereon can be selected according to various possibilities. It is, for example, conceivable to derive the movement of the textile band and of the rod connected thereto from a corrugated driving roller cooperating with a stationarily arranged spur rack on which the driving roller rides during the transport of the hanger along its path of movement. In most cases it is, however, sufficient and constructionally more simple if the drive means comprises a follower being connected, optionally via a lever means, or a gear means with the rod connected to the textile band, and having associated with it a stud protruding into the path of movement of the hanger. Actuation of the drive means and transport of the dough portion in the direction of the edge of the support means is initiated when the follower contacts the stud. According to the invention, the follower can be arranged on a pivotable lever arranged for pivotal movement around the pivotal axis of the hanger or around an axis parallely extending thereto, said lever extending close to the support means and being connected there with the textile band with interposition of the rod. This results in an extremely simple construction which is of advantage in view of the overall costs of the fermentation receptacle or proofing chamber or the like within which a plurality of such hangers is arranged. For avoiding any unilateral stress and thus any canting of the arrangement, according to a preferred embodiment of the invention, two levers are provided at both ends of the support means and are mutually connected by the rod connected to the textile band and by a further rod arranged between said first mentioned rod and the pivotal axis of the levers.

A further favorable embodiment is one in which the rod extends through a slot provided in at least one side plate of the hanger and forms an extension located outside of the side plate, the follower having associated therewith a stud extending into the path of movement of the follower. With this construction, all constructional parts of the drive means are arranged outside of the trough-like support for the dough portions comprising the side plates so that any contact between the dough portions and constructional parts of the drive means is avoided. In this manner, the dough portions, a plurality of which are in most cases arranged in a row on the support means of one hanger, can be placed in very close proximity to the side plates.

It is to be preferred that the textile band surrounds the support means only loosely. This avoids the considerable friction that occurs between the textile band and the base plate forming the support member. The upper portion of the textile band, that is the portion situated above the support member, thus contacts the support member over substantially the total area thereof, so that it is avoided that the textile band overlies the support member in a tensioned condition, which would make the textile band resilient so that the dough portions would jump on the textile band when they are put thereon by a dough portion feeding device, for example a conveyor belt. A loosely arranged textile band has also the advantage that any tension on the support is avoided so that a relatively thin plate or a thin sheet of metal can be used for the support means, thus decreasing the total weight of the hanger.

The invention is further illustrated with reference to the accompanying drawings showing non-limiting embodiments of a hanger according to the invention.

BRIEF DESCRIPTION OF THE DRAWINGS

The invention will be further explained by describing preferred embodiments with reference to the accompanying drawings in which FIG. 4 shows a modified embodiment of the invention and FIGS. 5 and 6 show a further modified embodiment in two different operating positions.

DESCRIPTION OF THE EMBODIMENTS

Figure 1:
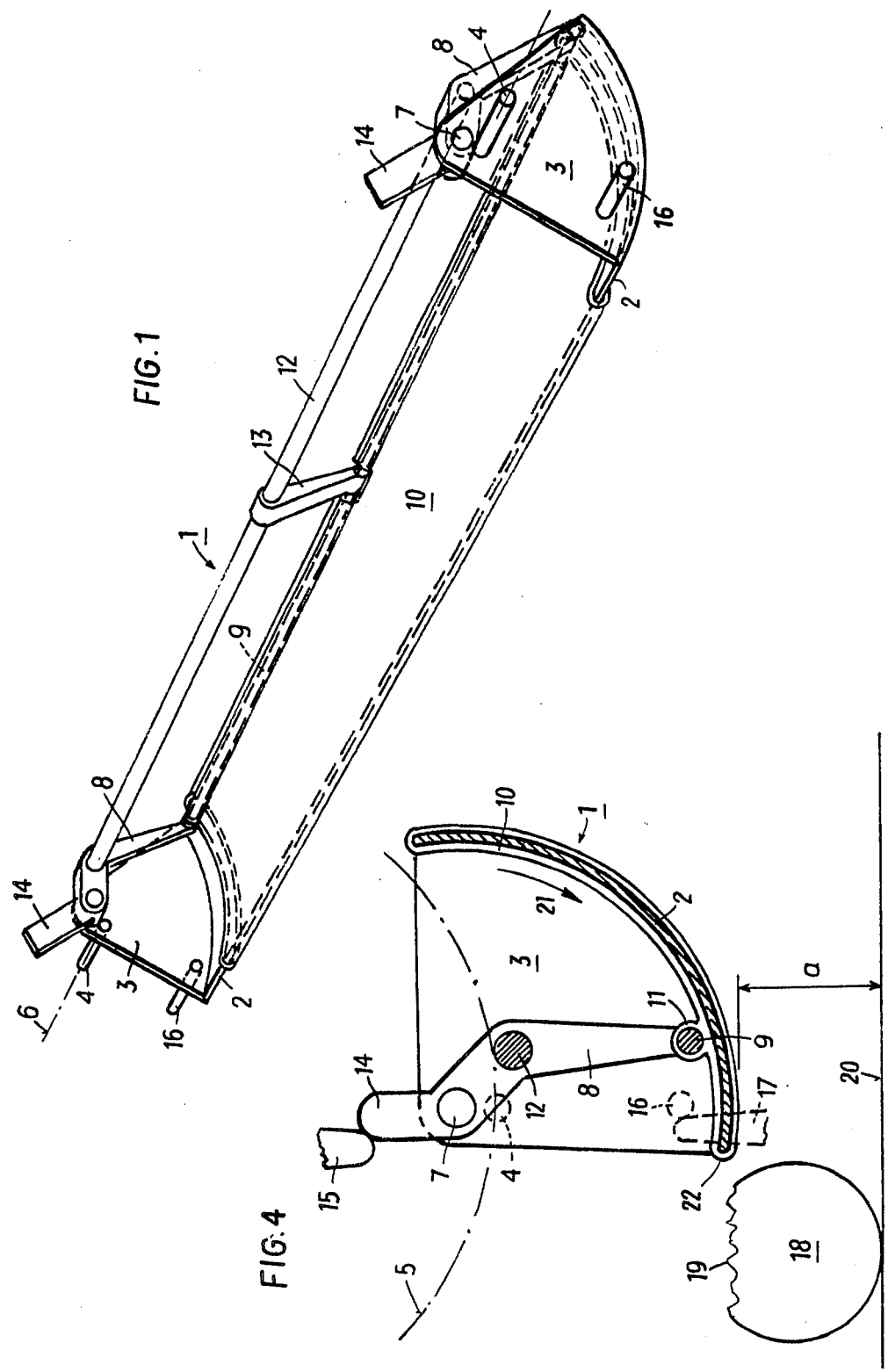
FIG. 1 shows a first embodiment of a hanger according to the invention in a perspective view, FIGS. 2 and 3 each show a section in transverse direction relative to the longitudinal direction of the hanger according to FIG. 1 in two different operating positions.
Figure 2:
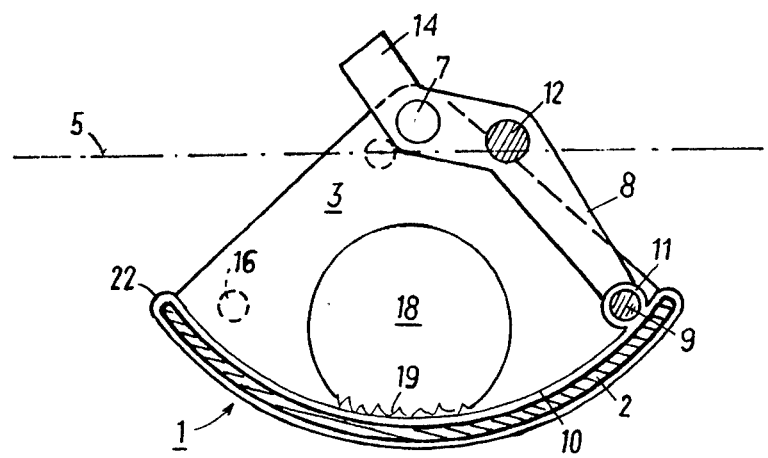
Figure 3:
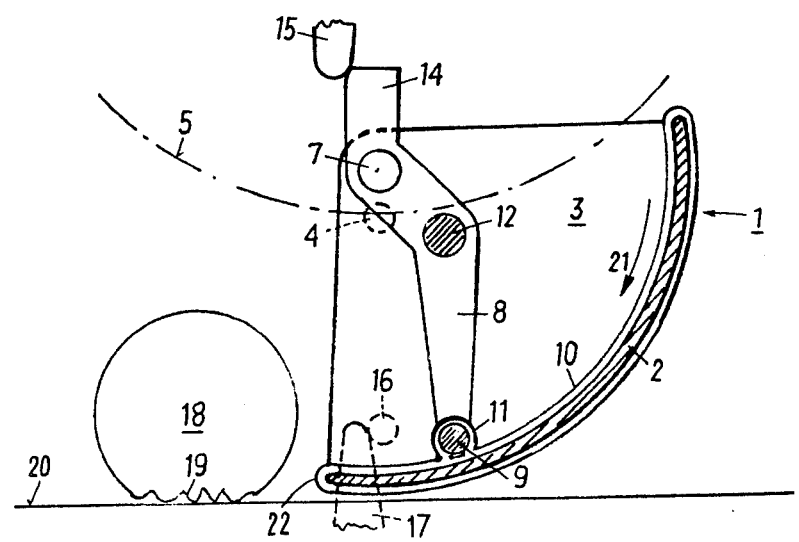

In the embodiment according to FIGS. 1 to 3, the hanger 1 for transporting dough portions through a fermentation chamber or the like has a rigid support means 2 being designed as a vaulted trough of sheet metal. The support means 2 is fixed to two side plates 3 of sheet metal, each of which has a pin 4 protruding in an outward and horizontal direction, said pins 4 serving to suspend the hanger 1 in the block chains or transport chains 5 only schematically shown in FIGS. 2 and 3. Thus the hanger 1 is pivotally connected to these block chains 5 for being swivelled around a horizontal axis 6. Further, a lever 8 is pivotally supported on an axis 7 at each side plate 3, said lever 8 extending to close proximity of the support means 2. Both levers 8 are at their lower ends connected by a rod 9 fixed to a textile band 10 which is a felt cloth. This textile band 10 is passed in the form of an endless loop around the support means 2 and contacts substantially its total upper surface. The rod 9 can be sewed into a loop 11 of the textile band 10 (FIGS. 2 and 3). The arrangement is stiffened by a further rod 12 connecting both levers 8 at their middle portion, a rigid connection 13 between both rods 9, 12 being provided at the middle portion of the longitudinal dimension of the hanger 1. Each lever 8 carries further an extension forming a follower 14 cooperating with a stud 15 (FIG. 3), stationary within the fermentation chamber (not shown) and protruding into the path of movement of the follower 14. Both side plates 3 carry at their lower portion an outwardly protruding pin 16 cooperating with an abutment 17 arranged stationarily within the fermentation chamber and extending into the path of movement of the pin 16.

Thus, the stud 15 together with the follower 14 and the lever 8 constitute a drive means for driving the textile band 10 relative to the support means 2.

The operation is as follows: The dough portions 18 rest, after having been put onto the hanger 1, with their closed area 19 on the textile band 10, which in turn rests on the support means 2 and are passed in this position by the hanger 1 through the fermentation chamber. If, after fermentation, the dough portions are to be transferred to a supporting surface 20 (FIG. 3), for example a conveyor belt, the follower 14 contacts the stud 15 which results in shifting the rod 9 and thus also the textile band 10 carrying the dough portions 18 relative to the support means 2 in direction of arrow 21 (FIG. 3). The dough portions 18 resting on the hanger 1 in consideraion are thus transported in direction to the leading edge 22 (as seen in direction of movement of the hanger) of the support means 2. Simultaneously, the hanger 1 is tilted around the axis 6 by means of the pin 16 contacting the abutment 17 so that the dough portions 18 are transferred from the support means 2 and from the textile band 10 resting thereon, respectively, to the supporting surface 20 located immediately below the hanger, so that the dough portions do not have to fall over a substantial distance. This is accomplished by the dough portions 18 being easily and reliably loosened from the textile band 10 when this band is moving along the edge 22 of the support means 2. The dough portions 18 arrive on the supporting surface 20 with their side (closed area 19) having previously contacted the textile band. In this manner the dough portions are sparingly transferred from one supporting surface to the other. The arrangement is in this case preferably such that the speed of the supporting surface 20 is, at the moment in which the hanger 1 is tilted and is thus stopped (in relation to its travelling movement within the fermentation receptacle), of equal magnitude to the speed with which the dough portions 18 are transported from the textile band 10 over the edge 22. The transfer of the dough portion can however also be effected such that the supporting surface 20 receiving the dough portions is stopped at the moment of transfer of the dough portions, noting that also the textile band 10 and the rods moving this band are maintained in rest. In this case the supporting means 2 would have to be swivelled relative to the textile band 10 and the rod 9 controlling same by means of a suitable device not shown, so that the textile band 10 can transfer the dough portions 18 onto the supporting surface 20.

In the embodiment according to FIG. 4, the construction of the hanger and of the abutments 15, 17 influencing the movement of the hanger is the same as in the embodiment according to the FIGS. 1 to 3. The supporting surface 20 is, however, not arranged immediately below the support means 2 but at a certain distance a below this support means. This provides the possibility to turn over the dough portions when transferring same from the hangers 1 onto the supporting surface 20 so that the closed area 19 of the dough portions 18 is now on top after the transferring step, in the opposite than before. This is of advantage particularly if shaped pastry is to be produced. It is convenient to make the mentioned distance a variable, for example by varying the level of the supporting surface 20, to provide an adaptability to various sizes of dough portions 18 transported by the hangers.

Figure 5:
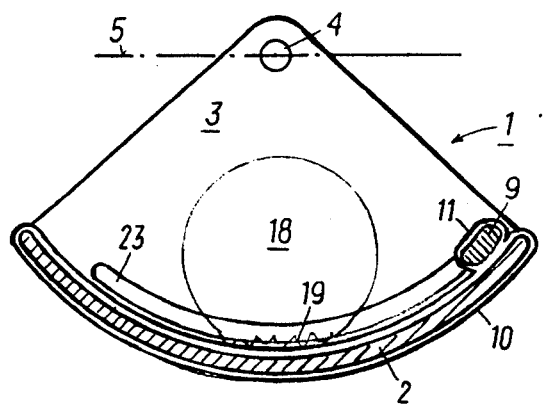
Figure 6:
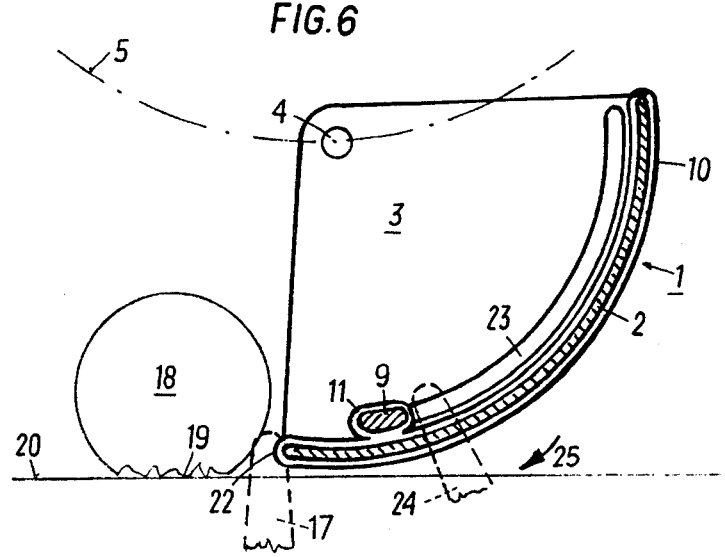

In the embodiment according to FIGS. 5 and 6 the drive means for moving the textile band 10 relative to the support means 2 is of another type than in the embodiment according to FIGS. 1 to 3. Also in the embodiment according to FIGS. 5 and 6 there is provided a rod 9 extending in the direction of the pivotal axis 6 and having fixed thereon the textile band 10 by means of a loop 11, but now this rod 9 extends with both of its ends through slots 23 of both side plates 3. The ends of the rod 9, which extend through the side plates 3 in an outward direction, form followers which are following during the tilting step a stud 24 moved by a suitable drive means (not shown) in the direction of arrow 25 such that the dough portions 18 are transported by the textile band 10 to the edge 22 of the support means 2 and are thus put onto the supporting surface 20 in a maximum sparing manner. Tilting of the hanger 1 is effected, in the manner already described, by an abutment 17 contacting a follower or the leading edge 22 of the hanger 1. Transfer of the dough portions 18 is effected according to FIG. 6 with unchanged orientation of the closed area 19, but it is also possible to turn over the dough portions 180° as was described in connectin with FIG. 4 by correspondingly lowering the supporting surface 20. In the embodiment according to FIGS. 5 and 6, the rod 9 serving the purpose of transporting the textile band 10 is given a somewhat greater width than in the embodiment according to FIGS. 1 to 4. This required width b of the rod 9 prevents the textile band 10 from being moved over the whole length of the support means 2 (as measured in moving direction of the hanger 1) in case both side plates 3 are not broadened over the extent of the supply means.

In FIGS. 3, 4 and 6 the travelling path of the block chain 5 is shown as being arcuate. This results from the circumstance that the block chains 5 are passed around guide sprockets (not shown) at the area of transfer of the dough portions.

What I claim is:

1. A suspended hanger pivotally mounted for rotation about a horizontal axis comprising a frame having a substantially horizontally extending means for supporting dough portions, said support means having an edge, a band means of flexible material surrounding said support means and covering same in form of a closed loop and being in contact with said support means, a rod extending substantially parallel to said support means and being connected to said band means, and a drive means acting on said rod for moving the rod along the surface of said support means for moving the dough portions resting on said band means towards said edge.

2. A hanger as claimed in claim 1, wherein said band means is a textile band.

3. A hanger as claimed in claim 1, wherein said support means has a curved crosssection, with the concave side thereof facing upwardly, said band resting in surface contact on the upper side of said support means.

4. A hanger as claimed in claim 1, wherein said drive means comprises a protrusion adapted to engage a fixed stop, said protrusion being operatively connected to a lever means pivotably mounted on said frame and being connected to said rod.

5. A hanger as claimed in claim 4, wherein said lever means is a double lever having an upper and a lower arm, and said protrusion is formed by the upper arm of said double lever.

6. A hanger as claimed in claim 4, wherein said frame comprises two side walls interconnected to each other by said support means, said lever means consisting of two levers, each of said levers being pivoted in one of said side walls, and two levers being interconnected to each other by said rod and by a further rod.

7. A hanger as claimed in claim 6, wherein stiffening means are provided between said rod and said further rod.

8. A hanger as claimed in claim 1, wherein said frame comprises two side walls interconnected to each other by said support means, a slot being provided in at least one of said side walls, said rod with an extension protruding outwardly through said slot, said drive means comprising a means for engaging and moving said extension.

* * * * *